July 21, 1936.  S. G. DOWN  2,048,325
BRAKE CONTROL SYSTEM
Filed June 5, 1935
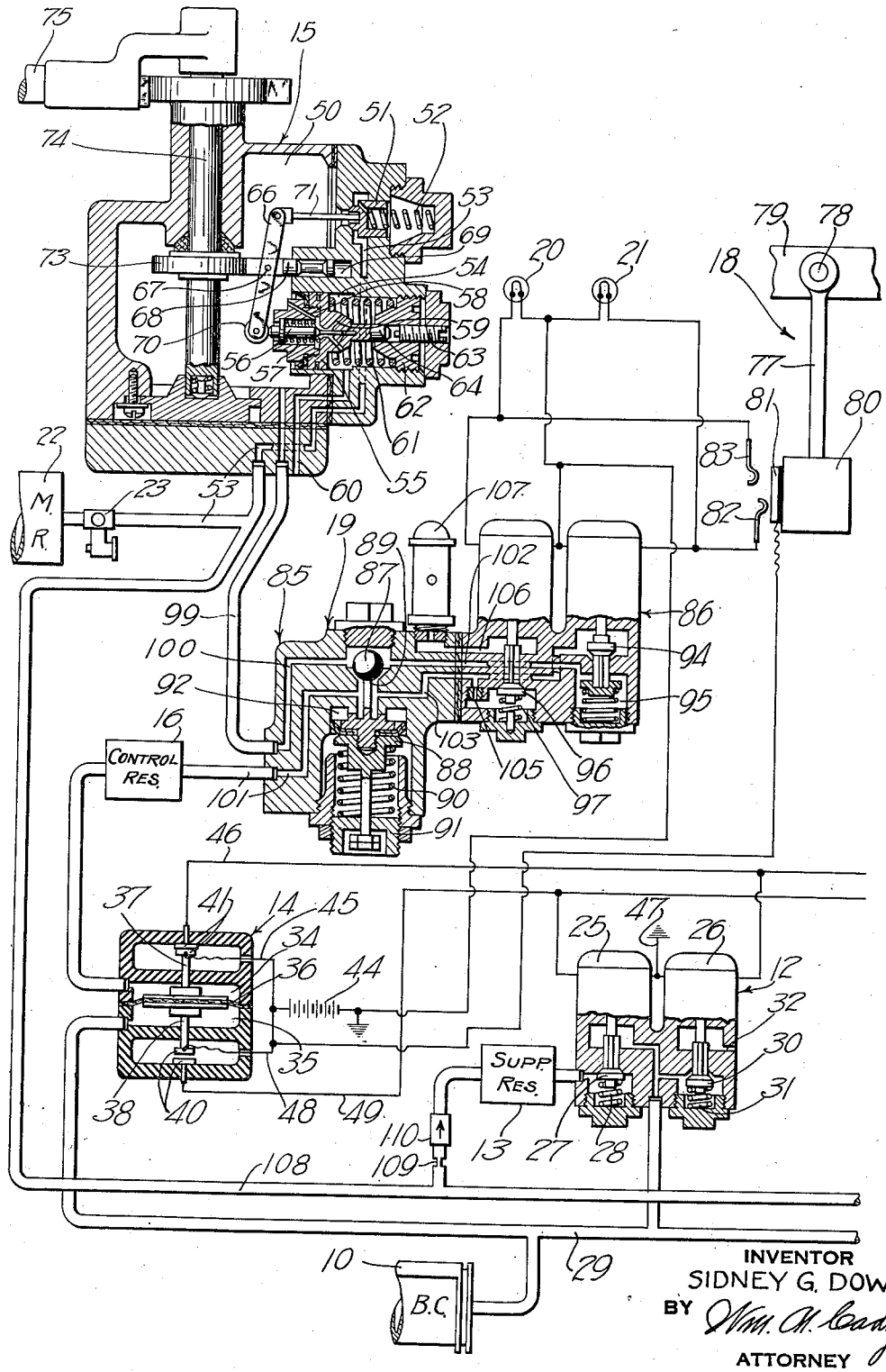
INVENTOR
SIDNEY G. DOWN.
BY Wm. A. Cady
ATTORNEY Patented July 21, 1936

2,048,325

UNITED STATES PATENT OFFICE 2,048,325

BRAKE CONTROL SYSTEM

Sidney G. Down, Edgewood, Pa., assignor to The Westinghouse Air Brake Company, Wilmerding, Pa., a corporation of Pennsylvania Application June 5, 1935, Serial No. 25,010

12 Claims. (Cl. 303—24)

This invention relates to brake control systems, and more particularly to brake systems for high speed railway trains and traction vehicles.

Safety considerations require that where trains and traction vehicles are to be operated at high speeds a braking equipment must be provided which combines a high degree of reliability with flexibility of control. A good example of such a braking equipment is that described and claimed in the application of Ellis E. Hewitt, Serial No. 741,063, filed August 23, 1934, for a Brake equipment, which application is owned by the assignee of the present application.

In the braking equipment illustrated in the Hewitt application a retardation controller device is provided for limiting the maximum rate of retardation which may be produced by an application of the brakes to a value which will not produce sliding of the wheels. The type of retardation controller device there shown is of the pneumatic type, operating a valve for controlling the pressure of fluid supplied through a control pipe. I propose to provide an improved form of retardation controlling mechanism adaptable for use with braking equipments of the type illustrated in the Hewitt application.

In this connection, I propose to provide a retardation controller device of the electric type, and mechanism associated therewith for controlling the pressure of fluid in a control pipe, so as to prevent the rate of retardation produced by braking from exceeding a chosen maximum value.

The electric type retardation controller device has certain advantages over the pneumatic type, in that it is more easily adjusted, can be adjusted for finer increments of control, and will retain its adjustment longer under varying conditions. Another advantage of the electric type is that it permits the employment of a simple form of indicating means for indicating when the retardation controller device has operated. The indicating means may be located in the operator's booth or cab, where he is informed by such when the retardation controller device has operated.

It is therefore a principal object of the present invention to provide an improved form of retardation controlling mechanism adaptable for use with braking equipment intended for use with high speed trains and traction vehicles.

A further object of the present invention is to provide a novel arrangement of specific apparatus for carrying out the aforementioned object.

Other objects and advantages of the invention will appear more fully from the following description, which is taken in connection with the attached drawing, wherein there is shown in diagrammatic and schematic form a simplified embodiment of the invention.

While the embodiment of the invention illustrated in the drawing has been shown in simplified form, it will be apparent as the description proceeds that the invention may be readily adapted to various types of high speed train braking equipments, and particularly to a type such as that disclosed in the aforementioned Hewitt application.

Considering briefly at first the embodiment illustrated, there is provided a brake cylinder 10 and a magnet valve device 12 for controlling the supply of fluid under pressure to and its release from the brake cylinder. A supply reservoir 13 provides a local supply of fluid under pressure. It is to be here understood that in adapting the embodiment illustrated to a train, at least one brake cylinder 10, a magnet valve device 12, and a supply reservoir 13, are provided on each car in the train, while the other parts about to be referred to need only be provided on the head end or control car.

For controlling operation of the magnet valve devices 12 throughout the train, there is provided a pneumatic control switch 14. For manually controlling operation of the switch device 14, to effect an application of the brakes, there is provided a brake valve device 15 and a control reservoir 16.

For controlling the rate of retardation of the train produced by an application of the brakes, so as to prevent the rate from exceeding a chosen maximum value, there are provided a retardation controller device 18 and a control valve device 19. Indicating devices 20 and 21 are provided to indicate operation of the retardation controller device 18.

A main reservoir 22 is provided as the main source of supply of fluid under pressure, and a feed valve device 23, which is of conventional type, regulates the pressure of fluid supplied from the main reservoir.

Considering now in detail the devices above enumerated, the magnet valve device 12 is embodied in a casing and is provided with an application portion 25 and a release portion 26.

The application portion 25 consists of a supply valve 27 urged toward a seated position by a spring 28, and toward an unseated position by action of an electromagnet in the upper part of that portion which when energized actuates the valve 27 downwardly. When the valve 27 is unseated, fluid under pressure flows from the supply reservoir 13, past the unseated valve 27, to a brake cylinder pipe 29, to which the brake cylinder 10 is connected. When the supply valve 27 is seated, this flow of fluid is cut off.

The release portion 26 consists of a release valve 30 urged toward a seated position by a spring 31, and toward an unseated position by action of an electromagnet in the upper part of the casing of this portion, which when energized actuates the valve downwardly. When the valve 30 is in unseated position, a communication is established between the brake cylinder pipe 29 and the atmosphere, past the unseated valve 30, and through port 32. When the valve 30 is seated, this communication to the atmosphere is cut off.

The pneumatic control switch 14 is embodied in a casing provided with two pressure tight chambers 34 and 35 separated by a flexible diaphragm 36. Secured to the diaphragm 36 are upper and lower stems 37 and 38, respectively. Movement of the diaphragm 36 controls through these two stems opening and closing of a set of application contacts 40 and a set of release contacts 41.

The diaphragm 36 is normally flexed upwardly to maintain closed release contacts 41. Closing of these contacts establishes a circuit from a battery 44 to the electromagnet in the release portion 26 of the magnet valve device 12, by way of a conductor 45, contacts 41, and train wire 46. The return circuit to battery 44 is by way of ground connection 47.

When fluid under pressure is supplied to the chamber 34, the diaphragm 36 is flexed downwardly to open contacts 41 and to then close contacts 40. Opening of contacts 41 deenergizes the electromagnet in the release portion 26, while closing of contacts 40 effects energization of the application portion 25, from battery 44, through a circuit which includes conductor 48, contacts 40, and train wire 49. The return circuit to the battery 44 is by way of the aforementioned ground connection 47.

When fluid under pressure is supplied to the chamber 35 to a degree slightly below the degree of pressure in the upper chamber 34, diaphragm 36 will move upwardly to a position where both contacts 40 and 41 are open. Both the application portion 25 and the release portion 26, of the magnet valve device 12, will then be deenergized. If the pressure of the fluid in the lower chamber 35 rises to a value substantially equal to or greater than the pressure of fluid in the upper chamber 34, diaphragm 36 will move upwardly to close contacts 41 to again energize the release portion 26.

The supply of fluid under pressure to the upper chamber 34, in the pneumatic control switch device 14, is controlled by the brake valve device 15. This brake valve device is illustrated as being of the self-lapping type, and is embodied in a casing defining a pressure chamber 50.

For controlling the supply of fluid under pressure to the pressure chamber 50, there is provided a supply valve 51 urged toward a seated position by spring 52. When the supply valve 51 is unseated, fluid under pressure flows from the feed valve device 23, through pipe and passage 53, past the unseated supply valve 51, to the pressure chamber 50.

Disposed in a chamber 54 in the valve device casing, is a movable abutment 55 in the form of a piston having interiorly thereof a release valve 56 urged toward an unseated position by a spring 57. When the release valve 56 is in unseated position, a communication is established between the pressure chamber 50 and the atmosphere, by way of passages 58 and 59, piston chamber 54 to the right of the abutment 55, and exhaust passage 60. When the release valve 56 is in seated position, this communication is cut off.

The movable abutment 55 is subject on its left hand side to pressure of fluid in the chamber 50, and on its right hand side to pressure of a regulating spring 61. Tension on the regulating spring is regulated by an adjusting member 62. A set screw 63 is provided in the regulating member 62, for engaging a plunger 64 associated with the movable abutment 55, to limit the travel of the movable abutment to the right.

For controlling seating and unseating of the supply valve 51 and release valve 56, there is provided a mechanism including spaced levers 66 pivotally secured at 67 to and carried by a slidable pivot carrier 68 disposed in a bore 69 in the casing. Between the lower ends of the spaced lever 66 there is rotatably carried a roller 70 for engaging the stem of release valve 56. Loosely held between the upper ends of the spaced levers 66 is a stem 71 for engaging the supply valve 51.

When the slidable pivot carrier 68 is actuated to the right, the spaced levers 66 pivot about their upper ends, while the lower ends swing inwardly to seat the release valve 56, due to the supply valve spring 52 being heavier than the release valve spring 57. As soon as the release valve 56 is seated, the spaced levers 66 pivot about their lower ends and the upper ends swing to the right to unseat the supply valve 51. During this movement the regulating spring 61 is unappreciably compressed, because it is heavier than either or both of the two springs 52 and 57.

With the release valve 56 seated and supply valve 51 unseated, fluid under pressure will flow to the pressure chamber 50. When the pressure of the fluid rises it acts upon the movable abutment 55 to actuate it to the right. When the movable abutment has been actuated sufficiently to the right, supply spring 52 will seat supply valve 51, to lap the supply to the pressure chamber 50. If the pressure in the chamber 50 has reached a value high enough to actuate the movable abutment 55 further to the right, then release valve 56 will unseat to release fluid under pressure from the pressure chamber 50, until the degree of pressure drops to the point where the release valve 56 is again seated.

A little thought will show that the pressure finally existing in the pressure chamber 50 will correspond to the degree of movement of the slidable pivot carrier 68 to the right.

For actuating the pivot carrier 68 to the right, there is provided a cam 73 secured to an operating shaft 74, which is rotatable upon movement of a handle 75. When the handle 75 is moved from a release position into an application zone, cam 73 is rotated. The periphery of cam 73 is such that as it rotates, it progressively moves the pivot carrier 68 to the right. Since the pressure of fluid supplied to the pressure chamber 50 corresponds to the position of the pivot carrier 68, it follows that the pressure of fluid in the pressure chamber 50 will also correspond to the degree of movement of the handle 75 into the application zone.

When the handle 75 is turned back to release position, the pivot carrier 68 will be returned to its extreme left hand position by action of one or more of the springs 52, 57 and 61, so that fluid under pressure is released from the chamber 50 to the atmosphere.

The retardation controller device 18 may be of one of a number of types, and I have therefore illustrated this device in diagrammatic form only. As there shown, the device comprises a pendulum 77 pivotally secured at 78 to a supporting casing 79, and having at its lower extremity a body 80. The pendulum 77 is disposed on the head end vehicle in a manner such that when the vehicle and train are decelerating, the inertia effect on the body 80 causes the pendulum to swing to the left a distance corresponding to the rate of deceleration.

The body 80 carries a contact 81 insulated therefrom, which contact is adapted to successively engage stationary and resilent contacts 82 and 83, disposed in the path of movement of the contact 81.

The contact 82 is adapted to be engaged by the movable contact 81 slightly ahead of the contact 83. Therefore, since the inertia effect on the body 80 is proportional to the rate of retardation of the vehicle or train, contact 81 will engage contact 82 at one rate of retardation, and will engage contact 83 at a slightly higher rate of retardation.

The control valve device 19 comprises an inshot valve portion 85 and a magnet valve portion 86. The inshot valve portion consists principally of a ball valve 87 normally held in unseated position by a piston 88 through a stem 89. A spring 90 urges the piston 88 upwardly, and the tension of the spring is adjustable through an adjusting nut 91.

The piston 88 is subject on its upper side to pressure of fluid supplied to a chamber 92, and when the pressure of this fluid has reached a predetermined value, piston 88 will have been actuated downwardly far enough to permit ball valve 87 to seat.

The magnet valve portion 86 comprises a cut-off valve 94 urged toward an unseated position by a spring 95 and toward a seated position by action of an electromagnet in the upper part of the casing, which when energized actuates the valve downwardly.

The magnet valve portion 86 is also provided with a release valve 96, which is urged toward a seated position by action of a second spring 97, and toward an unseated position by action of a second electromagnet in the upper part of the casing, which when energized actuates the valve downwardly.

The control valve device 19 is connected to the pressure chamber 50 in the brake valve device 15, by way of a pipe 99. Therefore, when fluid under pressure is supplied to the pressure chamber 50, it flows through pipe 99, passage 100, past the unseated ball valve 87, through pipe and passage 101, to both the control reservoir 16 and the upper chamber 34 in the pneumatic control switch 14. When the pressure of the fluid thus supplied reaches a value at which ball valve 87 is seated, it then flows around the seated ball valve through passage 102, past the unseated cut-off valve 94, and from thence through passage 103 and pipe and passage 101 to the control reservoir 16 and upper chamber 34. The purpose of the inshot valve portion 85 is to insure that fluid is supplied to the control reservoir 16 and upper chamber 34 to a predetermined degree should the cut-off valve 94 be accidentally seated.

If while both the ball valve 87 and the cut-off valve 94 are seated, the release valve 96 is unseated, fluid under pressure will be released from the control reservoir 16 and the upper chamber 34 to the atmosphere, by way of a choke 105, past the unseated release valve 96, through passage 106, and a safety valve device 107. The safety valve device 107 is of conventional design, and is provided to prevent a release of fluid below a predetermined pressure, so that in case the release valve 96 should be accidentally stuck in an open position all of the fluid supplied to the control reservoir 16 and upper chamber 34 will not be lost to the atmosphere.

The operation of this embodiment of my invention is as follows:

*Operation*

When the train is running the brake valve handle 75 is maintained in release position. The parts of the brake apparatus will then be in the positions shown in the drawing. The supply reservoir 13 on each car in the train will be charged from a main reservoir pipe 108, which connects with the feed valve device 23, through a choke 109 and a check valve device 110. The check valve device 110 permits flow of fluid only in the direction indicated by the arrow.

With the other parts in the positions as shown, the brake cylinder 10 on each car will be connected to the atmosphere, past the unseated valve 30 in the release portion 26 of each magnet valve device 12.

When it is desired to effect an application of the brakes, the brake valve handle 75 is moved into and unseating of supply valve 51 in the brake valve handle effects seating of release valve 56 and unseating of supply valve 51 in the brake valve device 15. Fluid under pressure is then supplied to the pressure chamber 50 to a degree according to the degree of movement of the handle 75. From the pressure chamber 50, fluid flows through pipe 99, passage 100, past unseated ball valve 87, and pipe and passage 101 to control reservoir 16 and upper chamber 34 in the pneumatic switch control device 14. The control reservoir 16 is provided to add volume to the system, so that the pressure in chamber 34 may be varied in finer increments. Diaphragm 36 is then actuated downwardly to open release contacts 41 and to then close application contacts 40.

Opening of contacts 41 deenergizes the release electromagnet in each magnet valve device 12, to effect seating of the release valve 30, thereby closing communication between the brake cylinder 10 and the atmosphere.

Closing of application contacts 40 effects energization of the application portion 25 of the magnet valve device 12, to unseat valve 27, and thereby permit fluid under pressure to flow from supply reservoir 13 to the brake cylinder 10.

As soon as the pressure of fluid supplied to the control reservoir 16 and upper chamber 34 reaches a predetermined value, inshot piston 88 will move downwardly far enough for ball valve 87 to be seated. Fluid then flows through the by-pass communication through the magnet valve portion 86, as before described. The inshot valve mechanism insures that a pressure will be established in the switch chamber 34 to a degree sufficient to apply the brakes, so that if the cut-off valve 94 is accidentally seated the train will be stopped.

Fluid flowing to the brake cylinder 10 on each car also flows through pipe 29 to the lower chamber 35 in the switch device 14, so that as the pressure of this fluid reaches a value slightly below the pressure of fluid in the chamber 34, diaphragm 36 will move upwardly to open contacts 40, while still maintaining contacts 41 open. The application portion 25 of the magnet valve device 12 will then be deenergized, and supply valve 27 will be seated by spring 28. The supply of fluid under pressure to the brake cylinders 10 will then be lapped at a pressure corresponding to that of fluid supplied to chamber 34.

As the pressure of fluid builds up in the brake cylinder 10 on each car, the train will then begin to decelerate. If the rate of retardation is high enough to cause pendulum 77 to swing far enough to the left for contact 81 to engage contact 82, the cut-off electromagnet in the control valve device 19 will be energized to effect seating of the cut-off valve 94. Further supply of fluid under pressure to the control reservoir 16 and upper chamber 34 will then be prevented.

As the train decelerates with the brakes thus lapped, the rate of retardation will increase due to the increase in coefficient of friction between the rubbing parts of the brakes. Therefore, pendulum 77 will swing further to the left and contact 81 will engage contact 83. When this takes place the release electromagnet in the control valve device 19 will be energized and release valve 96 will be unseated. Fluid under pressure is then released from control reservoir 16 and upper chamber 34 to the atmosphere, through choke 105, past unseated release valve 96, and through passage 106 and safety valve device 107. The combined action of choke 105 and control reservoir 16 is to make the release more gradual.

As the pressure diminishes in upper chamber 34 due to this release, diaphragm 36 will move upwardly to close release contacts 41. The release electromagnet in each magnet valve device 12 will then be energized to effect unseating of release valve 30. Fluid under pressure will then be released from each brake cylinder 10 to the atmosphere, past the unseated release valve 30 and through exhaust port 32.

As the brake cylinder pressure is thus diminished, the rate of retardation decreases and pendulum 77 swings to the right. As contact 81 disengages from contact 83, the release electromagnet in the control valve device will be deenergized, release valve 96 will seat, and the release of fluid under pressure from the control reservoir 16 and upper chamber 34 will be terminated. The pressure in the brake cylinders 10 will continue to diminish until the pressure in lower chamber 35 becomes equal to or slightly below the pressure in upper chamber 34, whereupon diaphragm 36 will move downwardly and open contacts 41. The release electromagnet in each magnet valve device 12 will then be deenergized, release valve 30 will be seated, and the brake cylinder pressure will then again be lapped.

It will thus be apparent that as the train decelerates, the pendulum 77 will move backward and forward to cause periodic engagement between contacts 81 and 83, while holding engagement with the contact 82, to intermittently effect a release of fluid under pressure from the brake cylinder 10 on each car.

As contact 81 engages contact 82, the indicating device 21 will effect an indication so that the operator will know that the supply of fluid to the control reservoir 16 and upper chamber 34 has been cut off. As contact 81 engages contact 83, the operator will be informed that the release of fluid under pressure from these two volumes is being effected. Thus each time the retardation controller device 18 functions to cut off or release fluid supplied to the control reservoir 16 and upper chamber 34, the indicating devices 20 and 21 will so inform the operator. The operator may then leave the brake handle 75 in full application position without danger of causing wheel sliding.

If a light application of the brakes is desired, such that the retardation controller device 18 will not become effective in controlling the application, it will then be apparent that the pneumatic switch device 14 will function according to the pressure of fluid established in the pressure chamber 50, to in turn effect a pressure in the brake cylinder 10 on each car to a corresponding degree.

When however the application has been to a degree such that the retardation controller 18 assumes control, and the brake valve handle 75 remains in application position, the train will be decelerated at a maximum rate to a stop. When the train comes to a rest the pendulum 77 will assume its normally vertical position, and a complete release may be effected.

However, the operator may make a release at any time by simply turning the brake valve handle 75 to release position, as ball valve 87 will unseat to permit fluid under pressure to be released from chamber 34.

While I have illustrated my invention and described it in connection with a single embodiment thereof, it is to be understood that I do not wish to be limited to the exact details shown nor otherwise than by the spirit and scope of the appended claims.

Having now described my invention, what I claim as new and desire to secure by Letters Patent, is:

1. In a vehicle brake system, in combination, brake means, fluid pressure operated switch means for controlling application of said brake means, means for effecting a supply of fluid under pressure to operate said switch means, electroresponsive means for controlling said supply, and means operated according to the rate of retardation of the vehicle for controlling said electroresponsive means.

2. In a vehicle brake system, in combination, brake means, a fluid pressure operated switch device for controlling application of said brake means, means for effecting a supply of fluid under pressure to operate said switch device, electroresponsive means operable to cut off said supply, contacts controlling said electroresponsive means, and means operated according to the rate of retardation of the vehicle for controlling said contacts.

3. In a vehicle brake system, in combination, brake means, a pressure operated switch device for controlling application of said brake means, means for effecting a supply of fluid under pressure to operate said switch device, an electroresponsive valve device operable when energized to cut off said supply, normally open contacts operable when closed to effect energization of said electroresponsive valve device, and means operated according to the rate of retardation of the vehicle for closing said contacts.

4. In a vehicle brake system, in combination, a brake means, a fluid pressure operated switch device for controlling operation of said brake means, means for effecting a supply of fluid under pressure to operate said switch device, a first electroresponsive valve means operable to cut off said supply, a second electroresponsive valve means operable to release fluid supplied to operate said switch device to diminish the pressure of said supply, contacts for controlling said two electroresponsive valve means, and a device responsive to the rate of retardation of the vehicle for controlling operation of said contacts.

5. In a vehicle brake system, in combination, brake means, a switch device having a chamber and being operable to control an application of said brake means according to the pressure of fluid supplied to said chamber, means for effecting a supply of fluid under pressure to said chamber, electroresponsive valve means for controlling the pressure of fluid supplied to said chamber, contacts for controlling energization and deenergization of said electroresponsive valve means, and an inertia operated device operable at chosen rates of retardation for operating said contacts.

6. In a vehicle brake system, in combination, a brake cylinder, electroresponsive valve means for controlling the supply of fluid under pressure to and its release from said brake cylinder, a switch device having a chamber and contacts operated according to the supply of fluid under pressure to said chamber for controlling said electroresponsive valve means, means for effecting a supply of fluid under pressure to said chamber, an electrically operated cut-off valve device operable when energized to cut off said supply, an electrically operated release valve device operable when energized to release fluid under pressure from said chamber, and means operable at a chosen rate of retardation for energizing said cut-off valve device and operable at another rate of retardation for energizing said release valve device.

7. In a vehicle brake system, in combination, a brake cylinder, electroresponsive valve means for controlling the supply of fluid under pressure to and its release from said brake cylinder, a switch device having a chamber and contacts operated according to the pressure of fluid supplied to said chamber, electroresponsive valve means for controlling the supply of fluid under pressure to and its release from said chamber, means governed by the rate of retardation of the vehicle for controlling said electroresponsive valve means, and means for insuring supply of fluid under pressure to said chamber to a predetermined degree regardless of operation of said electroresponsive valve means.

8. In a vehicle brake system, in combination, a brake cylinder, electroresponsive valve means for controlling the supply of fluid under pressure to and its release from said brake cylinder, a control reservoir, means for effecting a supply of fluid under pressure to said control reservoir, electroresponsive means controlled according to the rate of retardation of the vehicle for controlling the degree of fluid under pressure supplied to said control reservoir, a switch device having a movable abutment subject on one side to brake cylinder pressure and on the other side to pressure of fluid supplied to said control reservoir, and contacts operated by said movable abutment for controlling said electroresponsive valve means.

9. In a vehicle brake system, in combination, a brake cylinder, electroresponsive valve means for controlling the supply of fluid under pressure to and its release from said brake cylinder, contacts for controlling energization and deenergization of said electroresponsive valve means, a control device having a first chamber and a second chamber and a movable abutment subject on one side to pressure of fluid in said first chamber and on the other side to pressure of fluid in said second chamber, means controlled by said movable abutment for actuating said contacts, means for supplying fluid under pressure to said first chamber and for electrically controlling the degree of pressure of the fluid thus supplied according to a chosen rate of retardation, and means for supplying fluid under pressure to said second chamber corresponding to the pressure of fluid in said brake cylinder.

10. In a vehicle brake system, in combination, a brake cylinder, electroresponsive valve means for controlling the supply of fluid under pressure to said brake cylinder, a first set of contacts adapted when closed to effect operation of said electroresponsive valve means to supply fluid under pressure to said brake cylinder, a second set of contacts adapted when closed to effect operation of said electroresponsive valve means to release fluid under pressure from said brake cylinder, a casing having a first chamber and a second chamber and a diaphragm disposed between said two chambers for operating said two sets of contacts, means for supplying fluid under pressure to one of said chambers to any chosen degree, means for supplying fluid under pressure to the other of said chambers at brake cylinder pressure, and electrical means controlled according to the rate of retardation of the vehicle for varying the pressure of fluid supplied to said first mentioned chamber.

11. In a vehicle brake system, in combination, brake means, a fluid pressure operated switch device for controlling application of said brake means, means for effecting a supply of fluid under pressure to operate said switch device, electroresponsive means operable to cut off said supply, contacts controlling said electroresponsive means, means operated according to the rate of retardation of the vehicle for controlling said contacts, and means for indicating to an operator when said contacts have been operated by said last means.

12. In a vehicle brake system, in combination, a brake cylinder, electroresponsive valve means for controlling the supply of fluid under pressure to and its release from said brake cylinder, a switch device having a chamber and contacts operated according to the supply of fluid under pressure to said chamber for controlling said electroresponsive valve means, means for effecting a supply of fluid under pressure to said chamber, an electrically operated cut-off valve device operable when energized to cut off said supply, an electrically operated release valve device operable when energized to release fluid under pressure from said chamber, means operable at a chosen rate of retardation for energizing said cut-off valve device and operable at another rate of retardation for energizing said release valve device, and indicating means for indicating when each of said electrically operated valve devices has been energized.

SIDNEY G. DOWN.